United States Patent
Parsekian et al.

(10) Patent No.: US 11,666,936 B2
(45) Date of Patent: Jun. 6, 2023

(54) DEVICE AND METHOD FOR SCALING AND COATING OF CONTINUOUS MULTI-MATERIAL STRIPES AND PATTERNS

(71) Applicant: Georgia Tech Research Corporation, Atlanta, GA (US)

(72) Inventors: Ara Parsekian, Atlanta, GA (US); Tequila A. L. Harris, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 241 days.

(21) Appl. No.: 16/767,676

(22) PCT Filed: Dec. 3, 2018

(86) PCT No.: PCT/US2018/063688
§ 371 (c)(1),
(2) Date: May 28, 2020

(87) PCT Pub. No.: WO2019/109101
PCT Pub. Date: Jun. 6, 2019

(65) Prior Publication Data
US 2021/0370342 A1    Dec. 2, 2021

Related U.S. Application Data

(60) Provisional application No. 62/593,323, filed on Dec. 1, 2017.

(51) Int. Cl.
*B05C 5/02* (2006.01)
*B05C 9/06* (2006.01)
(Continued)

(52) U.S. Cl.
CPC .............. *B05C 5/0254* (2013.01); *B05C 5/00* (2013.01); *B05C 9/06* (2013.01); *B05D 1/26* (2013.01);
(Continued)

(58) Field of Classification Search
CPC ....... B29C 48/02; B29C 48/17; B29C 48/185; B29C 48/20; B29C 48/304; B29C 48/21;
(Continued)

(56) References Cited

U.S. PATENT DOCUMENTS

| 4,197,069 A | 4/1980 | Cloeren |
| 6,423,140 B1 * | 7/2002 | Liu ...................... B29C 48/305 |
| | | 425/133.5 |

(Continued)

OTHER PUBLICATIONS

Parsekian, A., et al., "Extrusion On-Demand Pattern Coating Using a Hybrid Manufacturing Process," Chemical Engineering and Processing, 2016 pp. 20-31. (Year: 2016).*

(Continued)

*Primary Examiner* — Laura Edwards
(74) *Attorney, Agent, or Firm* — Troutman Pepper Hamilton Sanders LLP; Ryan A. Schneider; Chris N. Davis (57) ABSTRACT

A hybrid scaling and patterning apparatus for producing thin films with multi-material, customized patterns is disclosed. The apparatus includes a slot die body integrated with multiple inlets and corresponding converging channels passing materials through the die body in a planar, continuous laminar flow. The hybrid scaling and patterning apparatus may be used in a method of preparing multi-material, patterned thin film materials.

7 Claims, 11 Drawing Sheets

(51) Int. Cl.
    *B05C 5/00*         (2006.01)
    *B29C 48/21*      (2019.01)
    *B29C 48/19*      (2019.01)
    *B29C 48/305*     (2019.01)
    *B05D 1/26*       (2006.01)

(52) U.S. Cl.
    CPC .............. *B29C 48/19* (2019.02); *B29C 48/21* (2019.02); *B29C 48/307* (2019.02)

(58) Field of Classification Search
    CPC ..... B29C 48/19; B29C 48/307; B05C 5/0254; B05C 9/06; B05C 5/027; B05C 5/00; B05D 5/06; B05D 1/26
    USPC .................................................. 118/411, 412
    See application file for complete search history.

(56) References Cited

U.S. PATENT DOCUMENTS 8,388,331 B2 *   3/2013   Osada ..................... B29C 48/08
                                                                                 425/133.5
2006/0269673 A1   11/2006   Yapel

OTHER PUBLICATIONS

Search Report from Application No. PCT/US2018/063688 dated Feb. 21, 2019 (9 pages).

* cited by examiner

DEVICE AND METHOD FOR SCALING AND COATING OF CONTINUOUS MULTI-MATERIAL STRIPES AND PATTERNS

CROSS-REFERENCE TO RELATED APPLICATIONS

This application priority under 35 U.S.C. § 119(e) to U.S. Provisional Patent Application Ser. No. 62/593,323, filed 1 Dec. 2017, which is hereby incorporated in its entirety as if fully set forth herein.

TECHNICAL FIELD

The various embodiments of this disclosure relate generally to coating thin films and, more particularly, to an apparatus and method for producing scaled and patterned thin films.

BACKGROUND

There are many processes for creating thin films, and these methods were developed to meet the manufacturing needs of specific technologies. For example, existing solution coating technologies such as slot die, curtain, and knife coating are able to manufacture thin films. These techniques were designed for creating high quality films in continuous single sheets. These techniques, however, have a limited ability to create patterns.

Slot die coating is a method of creating thin films on a substrate from liquid materials. The essence of the process is a die consisting of two halves separated by a shim, with a pressurized reservoir, or chamber, machined into one of the halves containing fluid. The purpose of the shim is to create a gap between the two halves through which the fluid may flow. The purpose of the chamber is to uniformly distribute the fluid therein along the width of the gap. As a result, slot die designs are generally limited to lines or stripes that are the opening of the shim, thereby limiting the ability of the slot die to create other desired patterns.

Patterned film deposition is a powerful manufacturing paradigm with applications spanning optoelectronics, sensors, computing, and wearable energy conversion. Liquid-phase film deposition techniques have long been recognized as suitable for rapid, continuous, low-waste processing near room temperature. Several of these techniques are adaptations of earlier graphical printing technologies, and thus the devices themselves are colloquially referred to as "printed." This nomenclature also reflects the perception that liquid-phase coating and patterning methods are amenable to roll-to-roll (R2R) manufacturing with significant economies of scale. However, scalability challenges in manufacturing have persisted, despite considerable progress in the materials and structures available for printed devices. One contributing factor may be that patterned coating techniques in use today have remained fundamentally unchanged for decades. It follows that new processing methods may prove broadly valuable for the field of printed thin film devices, if they can be adapted to wide-area deposition.

Wetting and microfluidic phenomena are integral to the operation of various coating techniques. Spin coating involves centrifugal force-assisted spreading of liquid on a rotating substrate. Blade and slot coating utilize viscous shear and surface tension to distribute coating liquid in a thin film. Spray coating achieves film uniformity by the transfer of coating fluid as evenly-dispersed droplets. While the patterning capabilities of these particular methods are limited, they can be combined with subtractive techniques such as laser ablation and localized dissolution to define a desired pattern. Alternatively, a physical mask can be used, as is common with screen printing and photolithography. Finally, a more recent approach has been the modification of wetting behavior by localized plasma or chemical pre-treatment of the substrate.

The most direct and consolidated approach to pattern printing, however, is mask-less selective deposition. Inkjet, flexographic, and gravure printing all embody this approach, and have been used in recent years to fabricate a diverse range of patterned thin film devices. However, these methods are generally more suited to low-viscosity coating liquids, which considerably limits their applicability and versatility. Furthermore, the tooling requirements for gravure and flexographic transfer are both significant and pattern-specific. And for inkjet printing, droplet impact spreading is counter-productive to pattern quality, while nozzle clogging is a practical problem that further constrains processing and material formulation. The sum of these observations is that no single deposition method today encapsulates all the advantages desirable for low-cost manufacturing at large scale.

Replicating the advantages of traditional slot coating in a similar, pattern-capable process is an appealing prospect.

SUMMARY

Some embodiments of this disclosure provide an apparatus and a system for scaling and patterning thin film materials. Other embodiments provide methods of producing scaled and patterned thin film materials.

To realize a system capable of producing on-demand, patterned films of high uniformity, there is provided a hybrid scaling patterning system. This system allows for single-step deposition of multi-material patterned thin films, and thus, improved patterned thin film processing for technologies that require more elaborate or arbitrary film patterns.

According to some embodiments of this disclosure, an apparatus for patterning thin films, comprising a slot die having a body comprising first and second plates, at least two fluid inlets, one fluid inlet for feeding a first material into the slot die and the other fluid inlet for feeding a second material into the slot die, and at least two channels formed inside of the slot die, one channel for receiving the first material, and the other channel for receiving the second material, each of the channels having a channel inlet end and a channel outlet end.

In some embodiments, the first and second materials travel from the channel inlet ends of the channels to the channel outlet ends of the channels in a planar, continuous laminar flow.

In some embodiments, each of the channels are converging channels.

In some embodiments, a total width of all the channel inlet ends of the converging channels is greater than a total width of all the channel outlet ends of the converging channels.

In some embodiments, a width of the channel inlet end of each of the converging channels is greater than a width of the channel outlet end of each of the converging channels.

In some embodiments, the apparatus can comprise eight inlets.

In some embodiments, the apparatus can comprise eight converging channels.

In some embodiments, the first and second materials travel from the channel inlet ends of the channels to the channel outlet ends of the channels in a planar, continuous creeping flow.

In some embodiments, the apparatus comprises a material selected from the group consisting of stainless steel, aluminum, nylon, polycarbonate and combinations thereof.

In some embodiments, the apparatus is configured to generate a scaled alternating-stripe pattern from interaction between the first and second materials within the die body.

According to some embodiments, is a method of preparing a multi-material, patterned thin film material, comprising providing an apparatus having a slot die having a body comprising first and second plates; at least two inlets, one inlet for feeding a first material into the slot die and the other inlet for feeding a second material into the slot die; and at least two channels formed inside of the slot die, one channel for receiving the first material, and the other channel for receiving the second material, each of the channels having a channel inlet end and a channel outlet end, and feeding the first material into the slot die through the one inlet and feeding the second material into the slot die through the other inlet, wherein the first and second materials travel from the channel inlet ends of the channels to the channel outlet ends of the channels in a planar, continuous laminar flow.

In some embodiments, the slot die used in the method does not include a shim.

In some embodiments, each of the channels used in the method are converging channels.

In some embodiments, in the above method, a total width all of channel inlet ends of the converging channels is greater than a total width of all of the channel outlet ends of the converging channels.

In some embodiments, in the above method, a width of the channel inlet end of each of the converging channels is greater than a width of the channel outlet end of each of the converging channels.

In some embodiments, in the above method, there are eight inlets.

In some embodiments, in the above method, there are eight converging channels.

In some embodiments, in the above method, the first and second materials travel from the channel inlet ends of the channels to the channel outlet ends of the channels in a planar, continuous creeping flow In some embodiments, the above method can further comprise depositing a fluid onto a substrate surface.

In some embodiments, in the above method, the substrate can be selected from the group consisting of paper, glass, thin plastic film, and thin metallic film.

According to other embodiments of this disclosure is a method of making patterned thin film materials. The method can include designing a surface pattern, inputting parameters of the designed surface pattern into a computer, passing a substrate having a substrate surface under a hybrid patterning apparatus, and patterning the designed surface pattern onto the passing substrate surface using the hybrid patterning apparatus.

Other aspects and features of embodiments of this disclosure will become apparent to those of ordinary skill in the art, upon reviewing the following description of specific, exemplary embodiments of this disclosure in concert with the various figures. While features of this disclosure may be discussed relative to certain embodiments and figures, all embodiments of this disclosure can include one or more of the features discussed in this application. While one or more embodiments may be discussed as having certain advantageous features, one or more of such features may also be used with the other various embodiments discussed in this application. In similar fashion, while exemplary embodiments may be discussed below as system or method embodiments, it is to be understood that such exemplary embodiments can be implemented in various devices, systems, and methods. As such, discussion of one feature with one embodiment does not limit other embodiments from possessing and including that same feature.

DETAILED DESCRIPTION

Referring now to the figures, wherein like reference numerals represent like parts throughout the several views, exemplary embodiments of this disclosure will be described in detail. Throughout this description, various components may be identified having specific values or parameters; however, these items are provided as exemplary embodiments. Indeed, the exemplary embodiments do not limit the various aspects and concepts of this disclosure as many comparable parameters, sizes, ranges, and/or values may be implemented.

The various embodiments of this disclosure relate to a system and apparatus for the patterning of thin films. The methods of manufacturing patterned thin films using the hybrid system are also described herein.

Figure 1:
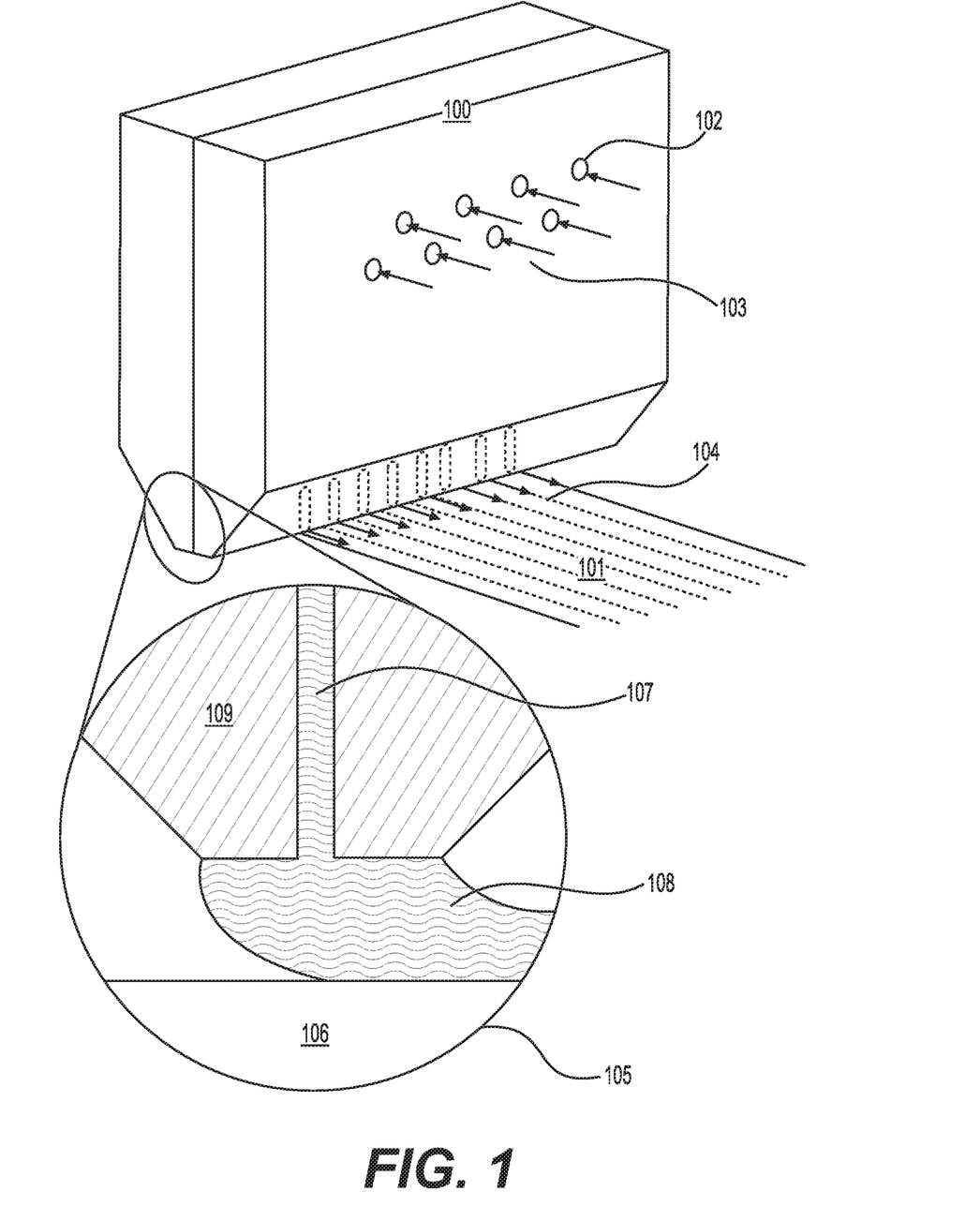
FIG. 1 illustrates a hybrid patterning apparatus in accordance with an exemplary embodiment of the disclosure.

Referring now to FIG. 1, there is shown a coating tool 100 (e.g. slot die, hybrid patterning apparatus), a heterogeneous liquid film 101 comprising two or more liquid materials in a horizontally-patterned configuration, an array of two or more fluid inlets 102; a flow of ink or other coating fluid 103 into the hybrid coating apparatus, and a region of outflow of ink or other coating fluid 104 out of hybrid coating apparatus 100 and onto a substrate to form a liquid film. As shown in cross-section view 105, hybrid patterning apparatus can further include substrate 106, ink or coating fluid 107 outflow from hybrid patterning apparatus 100, liquid bridge 108 between coating tool outlet region and deposited liquid film, and a die plate 109 of the hybrid patterning apparatus 100.

During operation, one or more liquid bridges form between the coating tool outlet and the substrate. The transfer of fluid through each liquid bridge, in turn, forms a patterned liquid film on the substrate surface. The volumetric flow rate Q, substrate velocity V relative to the coating tool, and the coating gap H between tool outlet and substrate are input parameters that can be varied during operation.

Figure 2A:
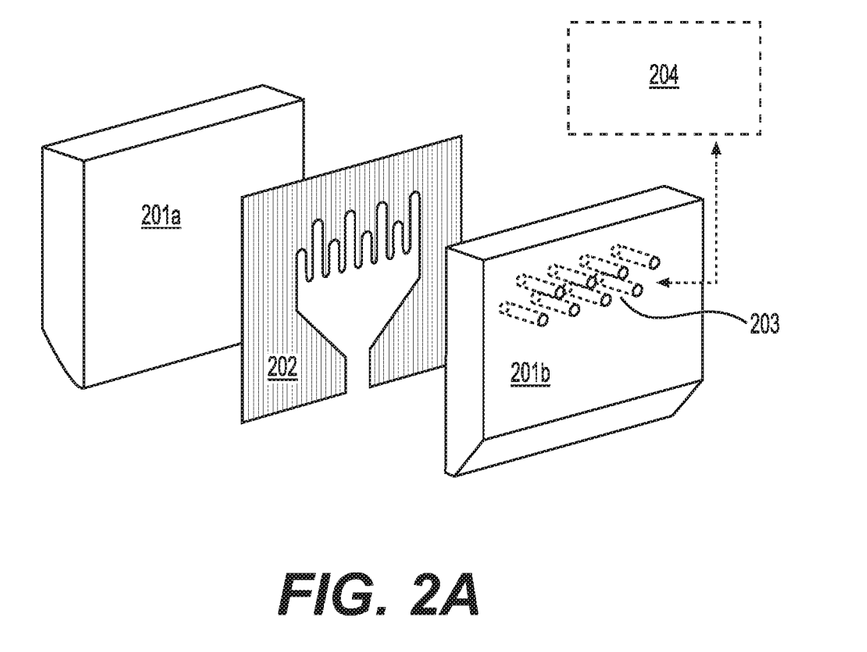
FIGS. 2A-2B illustrate components of a hybrid patterning apparatus, in accordance with an exemplary embodiment of this disclosure
Figure 2B:
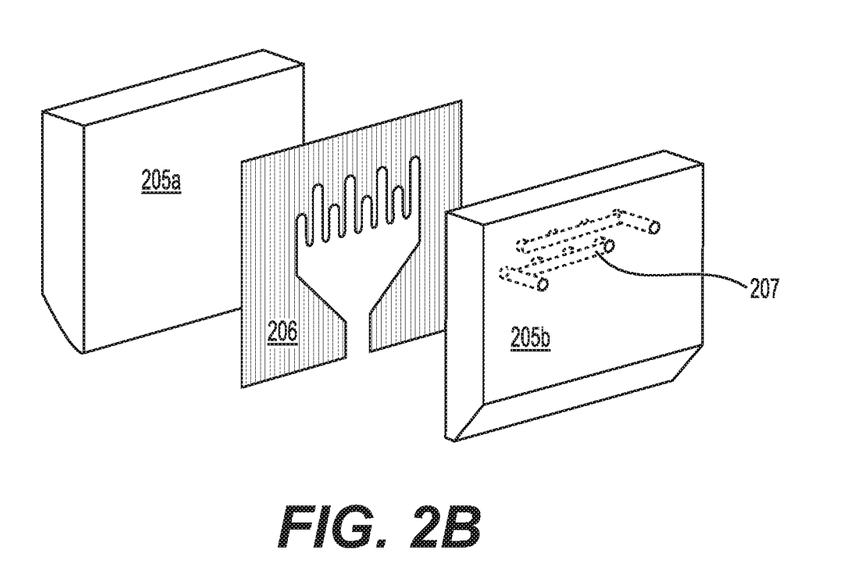

FIGS. 2A-2B shows slot die components in certain embodiments of the disclosure. As shown in FIG. 2A, the hybrid slot coating tool can include a slot die that includes a die body having two halves, or first and second plates, 201a, 201b, separated by one or more shims 202 with cutout(s) forming a slot-shaped cavity 202 positioned between first and second plates 201a, 201b for containing fluid to be deposited. It further includes an array of inlets 203 for delivering coating fluid to discrete regions of the internal geometry, an external manifold or distribution chamber 204 for coating fluid delivered to inlet array 203. FIG. 2B shows an alternate view of this embodiment of the hybrid patterning apparatus, with first and second plates, 205a, 205b, separated by one or more shims 206 with cutout(s) forming an internal slot-shaped cavity, internal distribution chambers, channels or cavities with inlet ends 207 integrated into one or more of the plates, 205a, 205b. In some embodiments, the internal distribution chambers, channels or cavities are converging. The purpose of shim(s) 206 is to create a slot gap between first and second plates 205a, 205b through which the fluid may flow. In some embodiments, slot gap can lead from cavity to an opening or a series of channel outlet ends. In some embodiments, cutouts in the shims define the geometry of the slot, and the shims can be interchanged to implement different flow behaviors and patterning strategies. At least two fluid inlets can be used to feed fluid to the slot. However, in some embodiments, multiple separate fluid inlets can be used (e.g. 3 inlets, 4 inlets, 5 inlets, 6 inlets, 7 inlets, 8 inlets, 9 inlets, 11 inlets, 13 inlets, 15 inlets, 17 inlets, 20 inlets).

Figure 3A:
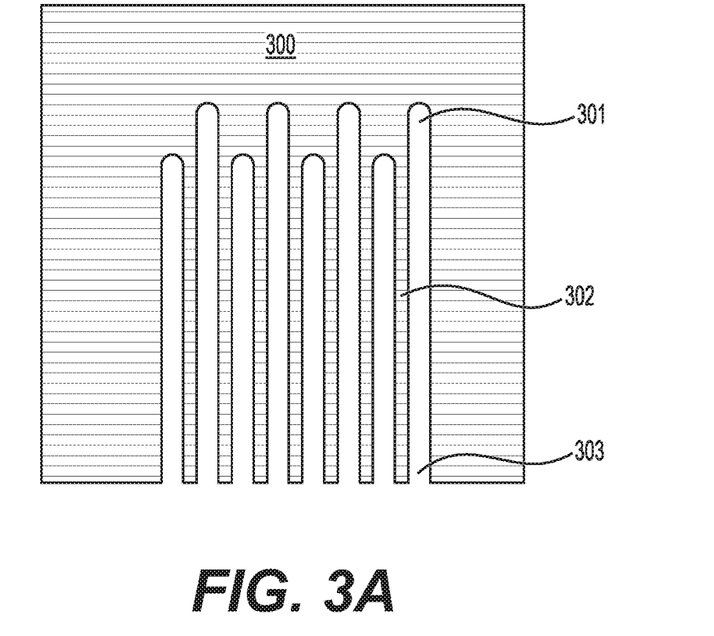
FIGS. 3A-3B illustrate the internal cavity geometry of a hybrid patterning apparatus, without internal scaling of the pattern, and corresponding deposition of a heterogeneous film pattern comprising alternating stripes of two distinct materials
Figure 3B:
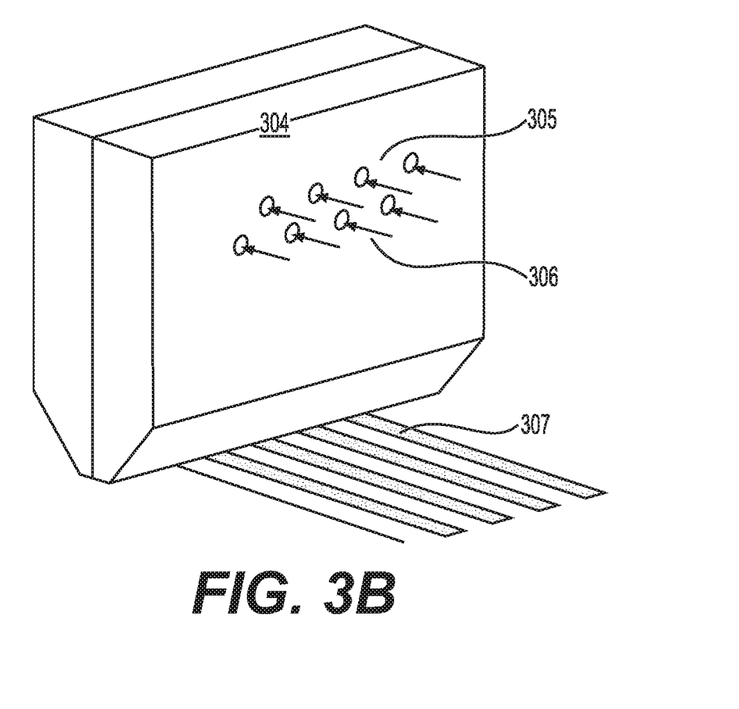

As shown in FIGS. 3A-3B, the shim configuration can be used for simultaneous deposition of two coating materials as alternating stripes. As illustrated, a heterogeneous alternating-stripe pattern is produced when two fluids are fed into alternating inlets (for example, corresponding both to alternating height positions of two rows of inlets, and alternating width positions of each inlet of the two rows of inlets, alternating laterally along a width of the slot die) of the hybrid slot coating tool. While slot coating has previously been adapted for deposition of narrow stripes of a single material, depositing two or more coating fluids simultaneously into a single-layer pattern is at least one novelty to this disclosure. As shown in each of FIGS. 1-5A and 6A, the array of inlets 102, 203, 401 can include a first set of fluid inlets that lie in a row at a first height of the slot die across the width of the slot die, and a second set of fluid inlets that lie in a row at a second height of the slot die across the width of the slot die, wherein the first height is different than the second height, such that the length of each of the inlet channels of the first set is different than the length of each of the inlet channels of the second set. FIG. 3A shows a shim material with cutout or cavity in a die plate forming an internal slot cavity. It further illustrates a region of cavity 301 corresponding to flow through each of fluid inlets 203, or from each of fluid outlets 207. Separation between different coating fluid species throughout the internal cavity is shown at 302. In some embodiments, the separation between the different coating fluid species is a physical separation. Separate outlet regions 303 correspond to separate flow streams within the coating apparatus. As shown in FIG. 3B, in some embodiments, hybrid patterning apparatus 304 can be assembled using the internal geometry shown in FIG. 3A. FIG. 3B further illustrates inflow of first coating fluid species 305, inflow of a second coating fluid species 306, and outflow of a heterogenous film comprising stripe-shaped regions of composition alternating between the first and second fluid species 307.

Slot die body can be made of any machinable material typically used in making slot die. These include but are not limited to stainless steel, aluminum, titanium, nylon, polycarbonate and combinations thereof. The material used to make slot die body generally is a function of the fluid that will be deposited. There should be compatibility between the slot die and the fluid with respect to chemical, electrical, mechanical, and physical properties.

Figure 4A:
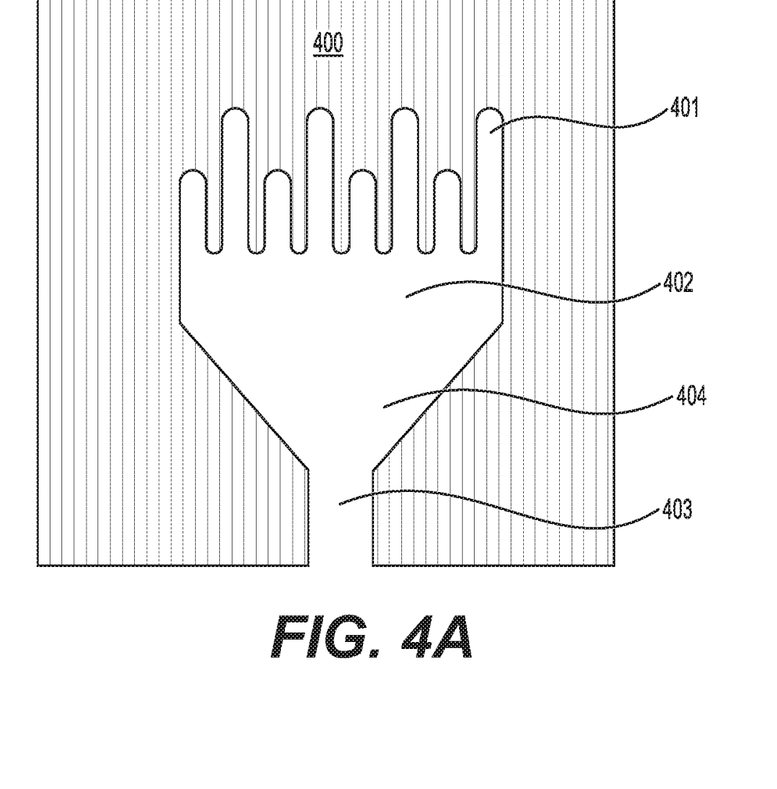
FIGS. 4A-4B illustrate the internal cavity geometry of a hybrid patterning apparatus with internal scaling of the pattern, in accordance with an exemplary embodiment of this disclosure.
Figure 4B:
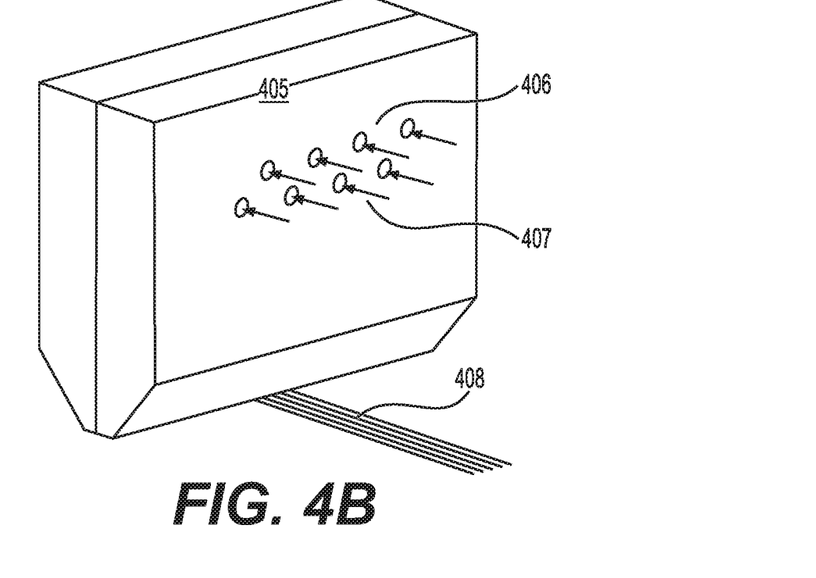

In some embodiments, as shown in FIGS. 4A-4B, a pattern-scaling mechanism can cause interaction between different coating fluids without a shim, which is not disruptive to the pattern formation. In FIG. 4A, a shim material with cutout or cavity in die block forms an internal slot cavity. Cavity region 400 corresponds to flow through each of inlets 401, or from each of outlets 407. Region 402 corresponds to maximum width $W_1$ of channels where multiple coating fluid species interact. In some embodiments, the species interact physically. Region 403 corresponds to width $W_2$ of channels and is connected to outlet region of the hybrid patterning apparatus. In some embodiments, $W_2<W_1$. Region 404 corresponds to varying width channels connecting cavity regions 402 and 403. In some embodiments, as shown in FIG. 4B, hybrid patterning apparatus 405 can be assembled using the internal geometry shown in FIG. 4A. FIG. 4B further illustrates inflow of first coating fluid species 406, inflow of a second coating fluid species 407, and outflow of a scaled heterogenous alternating-stripe-patterned film 408. Compared to the coating apparatus configuration of FIG. 3, the internal tool geometry is considerably reduced. Rather, an alternating-stripe phase field is established by the array of inlet channels opening into a single-wide slot, without a physical barrier separating the fluids in the channels. Narrowing of the channel width along the primary axis of flow produces a proportional narrowing of each phase region, a useful phenomenon that single-phase slot extrusion cannot exploit. This represents an improvement over previous tool designs, where the minimum achievable center-to-center distance of the narrow stripe pattern is essentially attributable to the precision of tool fabrication and assembly.

As shown in the figures, and specifically referring again to FIGS. 4A-4B, the present invention can comprise an apparatus for patterning thin films including the slot die, at least two fluid inlets 406, 407, a first fluid inlet configured for feeding a first fluid material into the slot die and a second fluid inlet configured for feeding a second fluid material into the slot die, and at least three channels formed inside of the slot die, a first inlet channel configured to receive the first fluid material, a second inlet channel configured to receive the second fluid material, and a third interaction channel 402, 404, wherein each of the first and second inlet channels have a channel inlet coincident with the respective first and second fluid inlets 406, 407 in the slot die, wherein the third interaction channel 402, 404 is communicative at an upstream end to the first and second inlet channels and configured to receive a flow of the first fluid material and the second fluid material, and at a downstream end to a fluid multi-material outlet 403 in the slot die through which a pattern of the first fluid material and the second fluid material can flow, wherein the third interaction channel defines a volume extending in a flow direction from the upstream end to the downstream end and configured such that the third interaction channel is free of a physical barrier separating the flow of the first fluid material and the second fluid material, and wherein the volume of the third interaction channel has a converging cross-sectional area from a width of the upstream end to a width of the downstream end, which is smaller than the width of the upstream end.

In another embodiment, the apparatus for patterning thin films can comprise the slot die, a first set of fluid inlets for feeding the first fluid material into the slot die, a second set of fluid inlets for feeding the second fluid material into the slot die, a first set of inlet channels laterally spaced apart and configured to receive the first fluid material, each of the inlet channels of the first set of inlet channels having a channel inlet coincident with a respective fluid inlet of the first set of fluid inlets in the slot die, a second set of inlet channels laterally spaced apart and configured to receive the second fluid material, each of the inlet channels of the second set of inlet channels having a channel inlet coincident with a respective fluid inlet of the second set of fluid inlets in the slot die, and a third interaction channel communicative connected at an upstream end to the first and second sets of inlet channels, and at a downstream end to the fluid multi-material outlet in the slot die through which a pattern of alternating first fluid material and second fluid material can flow, wherein the first set of inlet channels and the second set of inlet channels are arranged in an alternating order, such that an inlet channel of the first set of inlet channels is followed by an inlet channel of the second set of inlet channels as viewed laterally across the slot die, wherein the third interaction channel is configured to receive at the upstream end alternating flows of the first fluid material and the second fluid material from the alternating layout of inlet channels, wherein the third interaction channel defines a volume extending in a flow direction from the upstream end to the downstream end and is further configured such that the third interaction channel is free of a physical barrier separating the flows of the first fluid material and the second fluid material, and wherein the volume of the third interaction channel has a converging cross-sectional area from a width of the upstream end to a width of the downstream end, which is smaller than the width of the upstream end.

Figure 5A:
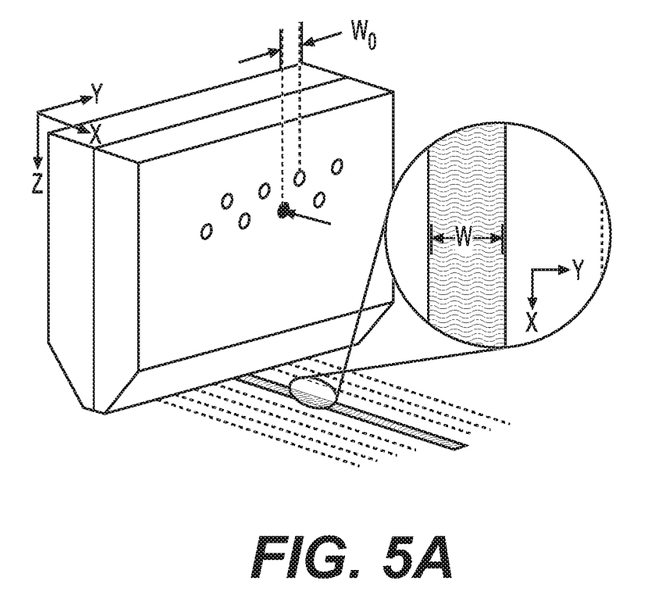
FIGS. 5A-5B illustrate test results related to single material deposition in narrow stripes, in accordance with an exemplary embodiment of this disclosure.
Figure 5B:
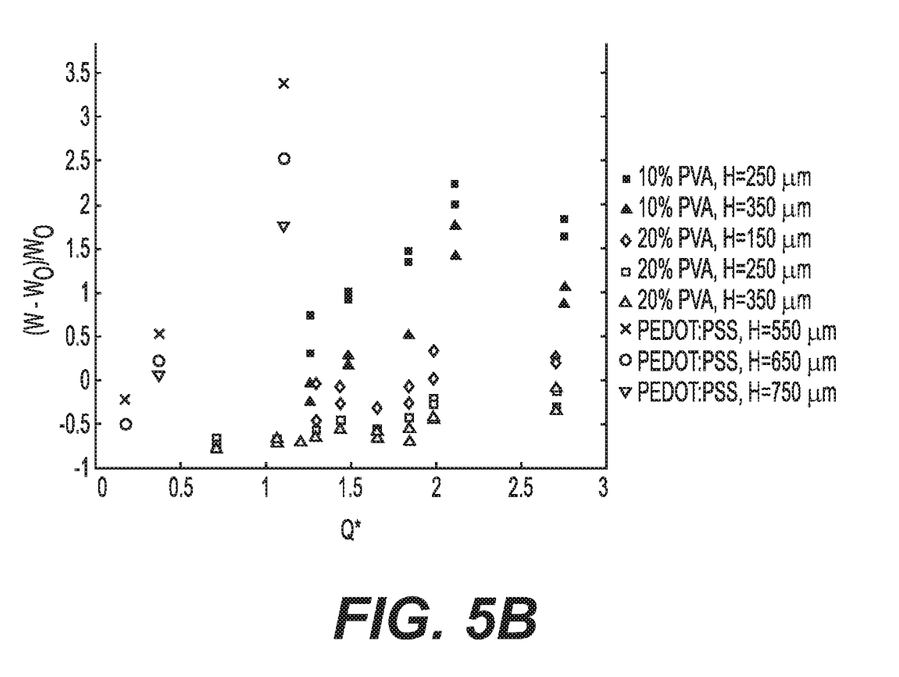

In some embodiments, the feature size capability of the hybrid slot coating can be tied to the minimum stripe width that can be deposited through an isolated liquid bridge. FIG. 5A illustrates the coating tool configuration used to produce this pattern feature under steady flow conditions. The fractional deviation in stripe width from tool inlet spacing, expressed as $w^* \equiv (w-w_0)/w_0$, is plotted in FIG. 5B against the dimensionless quantity $Q^* \equiv Q/(VGw_0)$, which represents fluid volume per unit width of substrate. Correlations between $w^*$ and $Q^*$, and between H and $Q^*$ comprise a two-parameter process input domain for controlling stripe geometry. Variations across the different coating fluids in FIG. 5B indicate the influence of both viscosity and wettability on the process control. For comparison, 20% aqueous polyvinyl alcohol (PVA) is more viscous than the other fluids by an order of magnitude, and both surface tension and contact angle of a surfactant-doped 1.3% aqueous dispersion of poly(3,4-ethylenedioxythiophene) polystyrene sulfonate (PEDOT:PSS) is significantly lower than that of aqueous PVA.

Figure 6A:
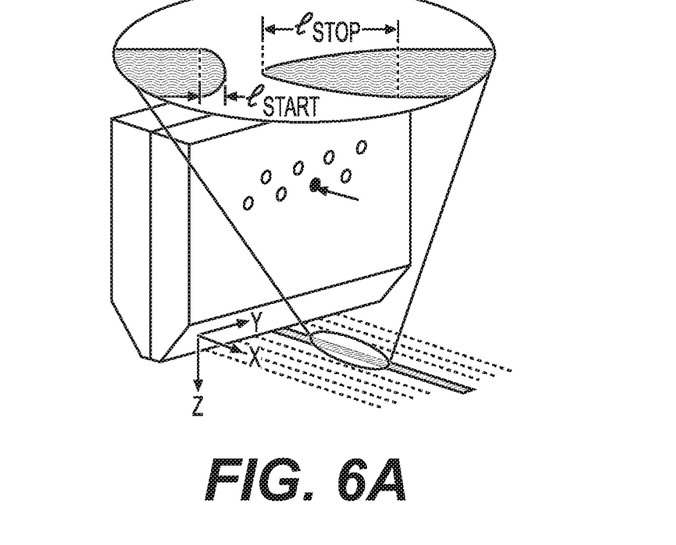
FIGS. 6A-6B illustrate results from a start and stop mechanism of the hybrid apparatus, in accordance with an exemplary embodiment of this disclosure.
Figure 6B:
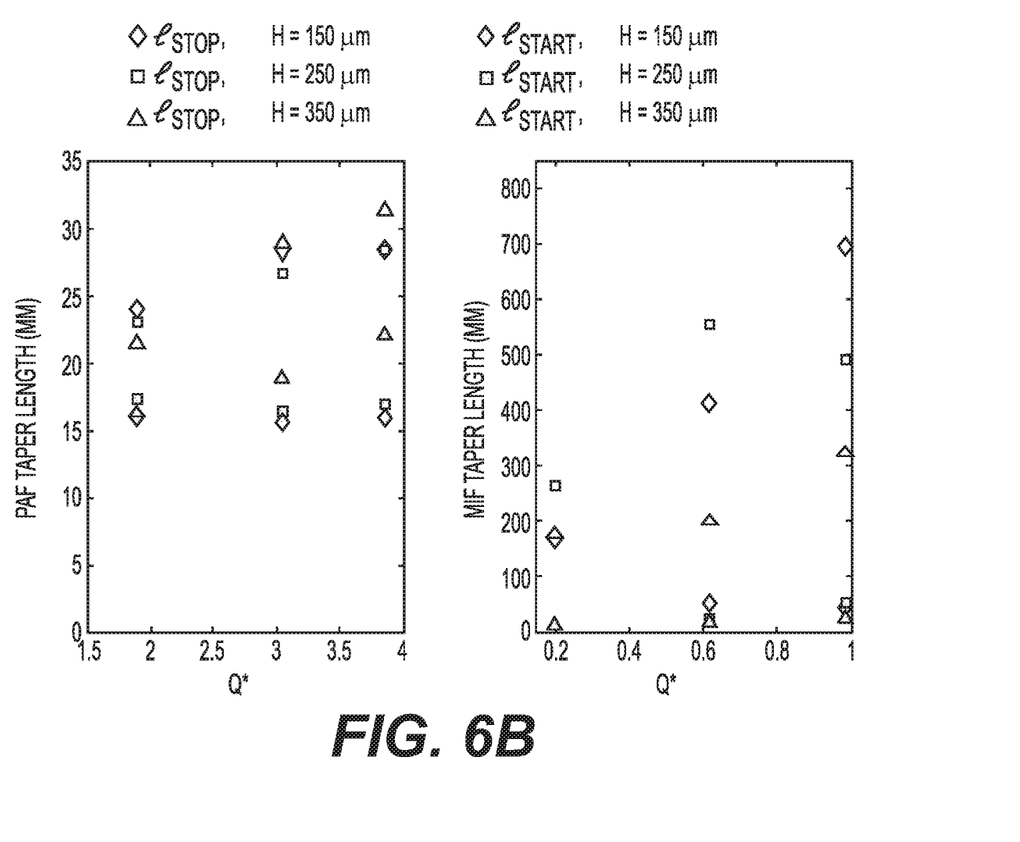

In some embodiments, the coating tool 100 can include mechanisms to start and stop the scaling and patterning process. FIG. 6A shows a configuration of the hybrid slot coating tool used to produce a segmented narrow stripe of 15% aqueous PVA on flexible PET substrate. The break in the stripe is produced by periodic flow cutoff and startup through a single inlet. FIG. 6B shows a comparison of actuation performance for various control schemes, measured as the length of the tapering at the leading and trailing edges of each stripe segment. The sum of $l_{START}$ and $l_{STOP}$ can be considered a lower limit on the minimum feature size along the x-axis. FIG. 6B compares the severity of this measurement for the various flow actuation schemes.

These relationships between coating bead behavior and feature size control can be understood in the context of a balance of viscous, interfacial, and inertial forces at the dynamic liquid bridge beneath the tool. Viscous shear appears to limit lateral spreading of the coating bead along the coating outlet. Surface tension at the liquid-gas interface limits spreading counter to interfacial forces associated with the solid-liquid interfaces. The balance between liquid-gas and solid-liquid interfacial force is also a function of the shape of the liquid bridge, which provides an intuitive explanation for the positive correlation between H and $w^*$.

The substrate can be moved at any suitable velocity to enable coating of the substrate. For example, according to embodiments of the present invention, a velocity of 25-100 feet per second is particularly preferred.

Any suitable film forming polymer can be used in the coating dispersion used in the process of this invention. Typical film forming polymers include, for example, but are not limited to, polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like.

In some embodiments, the coating dispersion used in the process can include, but are not limited to, polyvinyl alcohol (PVA), Mowiol® 4-88, poly(3,4-ethylenedioxythiophene): polystyrene sulfonate (PEDOT:PSS), Clevios PH1000, doped with 1% Triton X-100 surfactant and 6% ethylene glycol; polydimethylsiloxane (PDMS), Dow Corning 200® fluid; glycerol, and used in 95% concentration, and vacuum pump oil (VPO). Solid phase materials can also be included. Polyethylene terephthalate film (PET), ES301400, can be used as a flexible substrate for deposition of patterned films. PET shim stock can also be used to define the internal geometry of the hybrid slot coater, whose die block material is polymethyl methacrylate (PMMA), optically clear cast acrylic.

This disclosure also includes a method of preparing a patterned thin film material. According to the method, a desired surface pattern is first designed. The parameters of the designed surface pattern are input into a computer. A substrate having a substrate surface is passed under a hybrid patterning apparatus, and the designed surface pattern is patterned onto the passing substrate surface using the hybrid patterning apparatus.

Substrates and fluids suitable for use in this disclosure can be any material one of ordinary skill would use in a thin film apparatus. Suitable substrates for use in accordance with this disclosure include, but are not limited to, paper, glass, thin plastic film, and thin metallic film. Plastic film is the preferred substrate. Suitable substrates can be flexible, rigid, uncoated, precoated, as desired. The substrates can comprise a single layer or be made up of multiple layers. Suitable fluids that may be deposited in the patterning of the substrate include, but are not limited to, dispersions and organic and inorganic polymer solutions.

EXAMPLES

In accordance with this disclosure, a system has been designed and fabricated for the purpose of producing customized thin films. Initial studies have been performed to demonstrate such a system and to produce basic patterns as seen in various emergent technologies.

Example 1: Feature Size Control with Miscible Coating Liquids

Figure 7A:
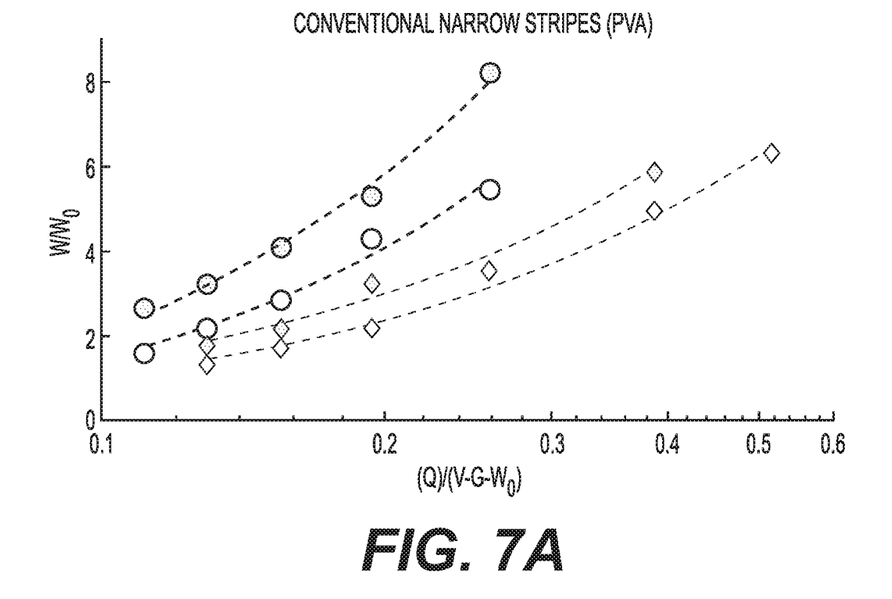
FIGS. 7A-7B illustrate test results related to multi-material deposition, in accordance with an exemplary embodiment of this disclosure.
Figure 7B:
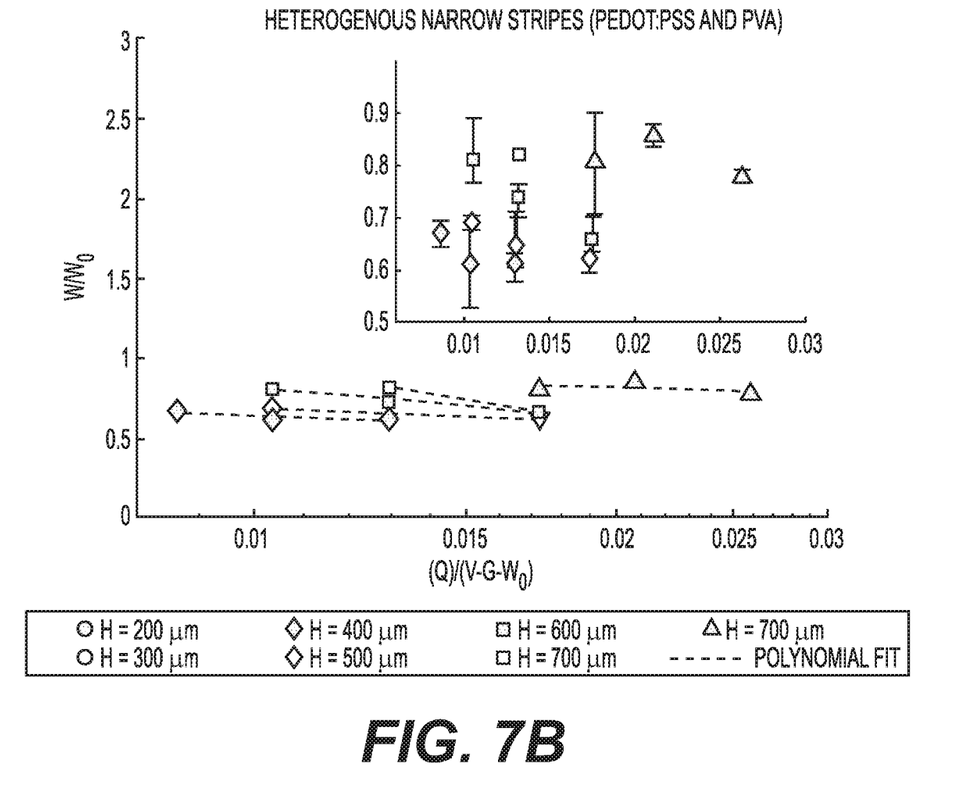

In some embodiments, simultaneous coating of two miscible liquids can consolidate the processing of alternating-stripe patterns into a single step. Deposition of each liquid species separately, in rows of narrow non-overlapping stripes, is the more conventional approach. Both strategies are compared with 10% aqueous PVA solutions coated on flexible PET substrate. FIG. 7A shows a process response of stripe width for narrow stripes of 10% aqueous PVA using the conventional approach, and for FIG. 7B alternating stripes of PVA and un-doped 1.3% aqueous PEDOT:PSS using the hybrid patterning apparatus. The volumetric flow-rate, Q, is specified as the average value per stripe. The single-phase approach shown in FIG. 7A requires multiple coating beads in the deposition region, each corresponding to an individual stripe. In the case with two miscible liquid phases illustrated in FIG. 7B, deposition flow behaves as a single coating bead with local variations in liquid phase. Consequentially, spreading effects at the coating bead edges are less significant, resulting in a more robust patterning capability. Whereas the widths of single-phase narrow stripes vary significantly across inputs, as shown in FIG. 7A the results for simultaneously-coated alternating stripes in FIG. 7B are largely independent of H and Q.

Example 2: Wetting-Derived Limitation for Immiscible Coating Liquids

Figure 8A:
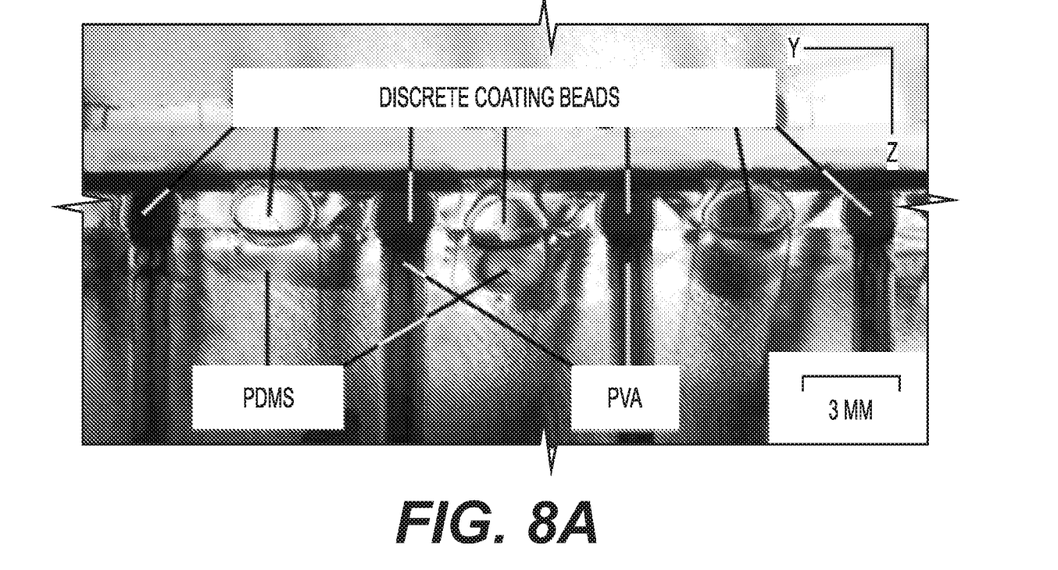
FIGS. 8A-8B illustrate a simultaneous deposition of PDMS and PVA during flow startup and after contact between two fluid regions.
Figure 8B:
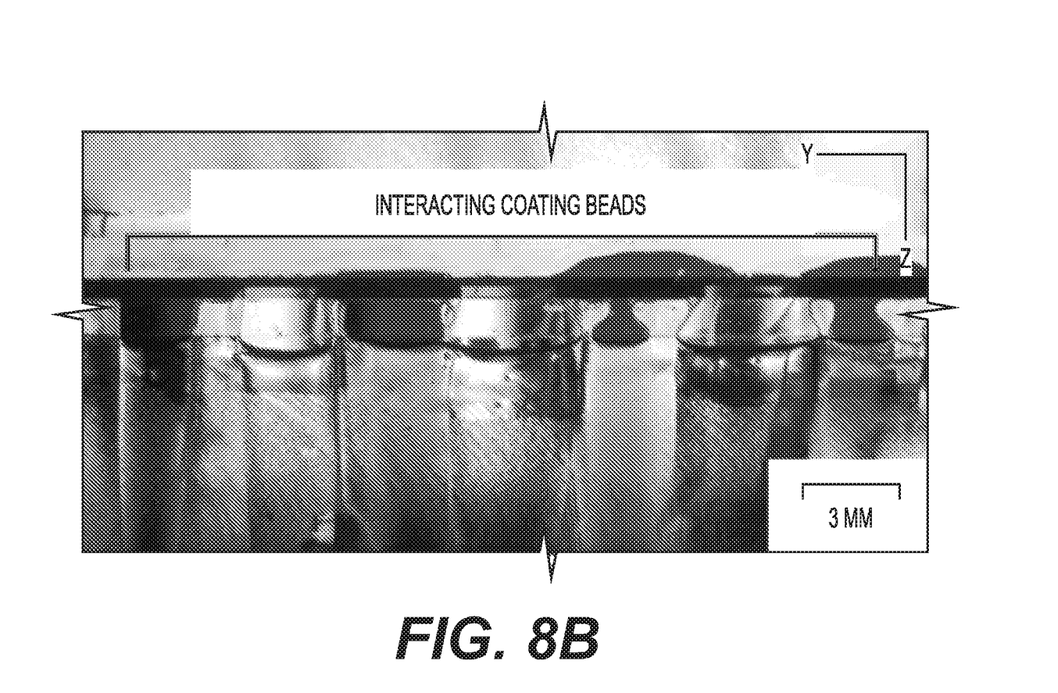
Figure 9A:
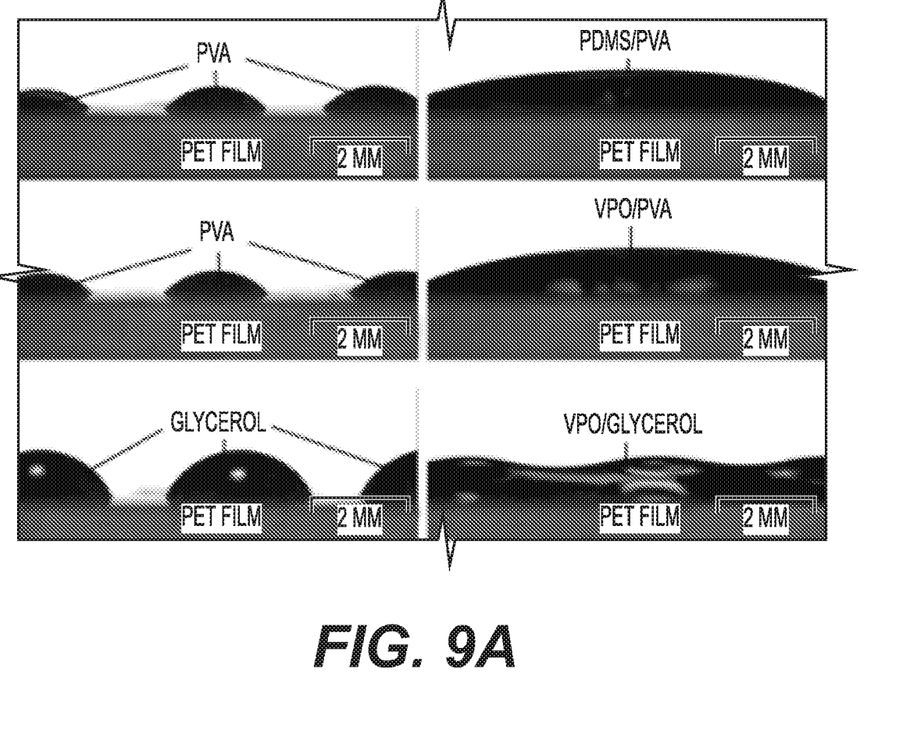
FIGS. 9A-9B illustrate alternating-stripe film structures constructed from various multi-material configurations and the static force balance for interacting stripes, in accordance with an exemplary embodiment of the disclosure.
Figure 9B:
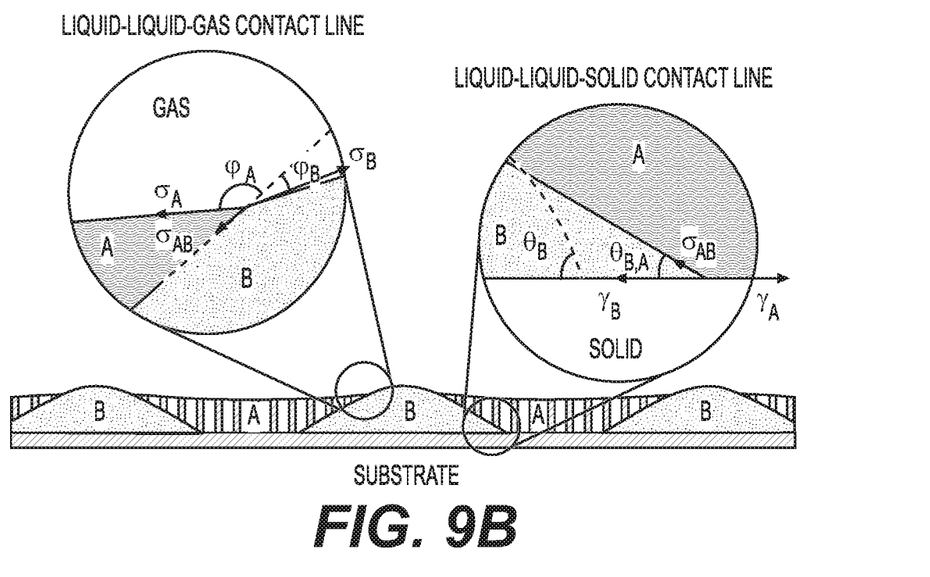

FIGS. 8A-8B illustrates the behavior of two immiscible liquids, PDMS and 24% aqueous PVA, processed simultaneously using the alternating-stripe patterning approach. Here, the concentration of aqueous PVA has been selected to match the kinematic viscosity of 1000 cSt of the PDMS solution. The developing flow sequence begins in FIG. 8A with fully-developed deposition flow of PVA, followed by flow startup of PDMS. PDMS accumulates within localized coating beads until interaction between the two liquid phases occurs, resulting in unsteady deposition flow characterized by enhanced spreading of both liquids along the width of the coating tool as shown in FIG. 8B. While complete description of liquid bridge dynamics observed above is beyond the scope of this investigation, the enhanced spreading aspect follows intuitively from the wetting transition illustrated below. Spreading of the lower-surface tension liquid over the surface of the higher-surface tension liquid is evident for three representative cases in FIG. 9A. Here, the surface tension of 24% aqueous PVA, PDMS, 95% glycerol, and VPO are 42 mN/m, 20 mN/m, 63 mN/m, and 31 mN/m, respectively. The interfacial tensions are 5.2 mN/m for aqueous PVA and PDMS, 8.2 mN/m for PVA and VPO, and 9.1 mN/m for glycerol and VPO. Given these interfacial properties, Young's equation for wetting predicts the observed spreading behavior due to formation of the liquid-liquid interface. At the liquid-liquid-gas contact line in FIG. 9B, Young's equation can be applied as follows:

$$0 = \sigma_{AB} - \sigma_A \cos \varphi_A + \sigma_B \cos \varphi_B \quad (1)$$

$$0 = \sigma_A \sin \varphi_A - \sigma_B \sin \varphi_B \quad (2)$$

Here, $\sigma_A$ and $\sigma_B$ are the surface tensions of the two liquids, $\sigma_{AB}$ denotes the interfacial tension between liquid phases, and their contact angles are given by $\varphi_A$ and $\varphi_B$. Similarly, at the liquid-liquid-solid contact line, the force balance can be expressed as:

$$0 = -\gamma_A \gamma_B + \sigma_{AB} \cos \theta_{B,A} \quad (3)$$

Thus, where the interfacial tension $\sigma_{AB}$ is small compared to forces at the other interfaces, equations (1)-(3) predict the formation of the shallow sloped cross section illustrated in FIG. 9D. In essence, the contact angles predicted for the liquid-liquid-gas contact line correspond to preferential wetting of the lower-surface tension liquid along the surface of the higher surface tension liquid. Similarly, equilibrium contact angles at the solid surface arise from movement of the unpinned liquid-liquid-solid contact line.

Example 3: Internal Flow and Pattern Scaling

Figure 10:
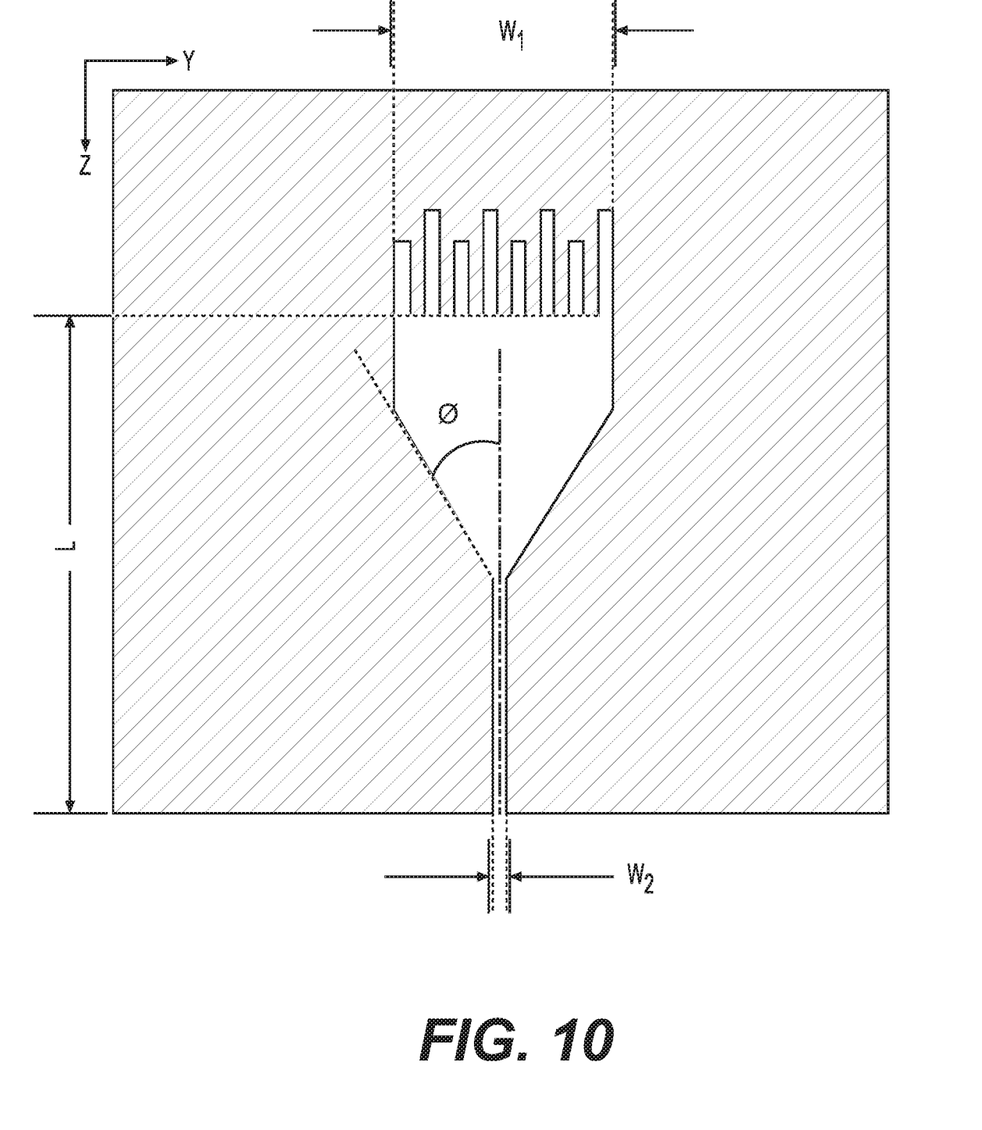
FIG. 10 illustrates a pattern with converging internal geometry in accordance with an exemplary embodiment of the disclosure.

The shim configuration illustrated in FIG. 10 generates an internal flow field for alternating-stripe patterns at high resolution. The converging section of the slot acts as a mechanism for scaling of the entire pattern, reducing the average width of stripes from an initial value, $\overline{w}1 \equiv W_1/N$ to a smaller value near the outlet region, Here, $\overline{w}2 \equiv W_2/N$ is the total number of stripes, $W_1$ is the overall slot width upstream from the converging section, and $W_2$ is the slot width near the outlet. The angle φ is relevant to design of the channel length L required for a given inlet configuration and desired pattern, although both the inlet configuration and L are kept fixed in this study for purposes of comparison.

Figure 11:
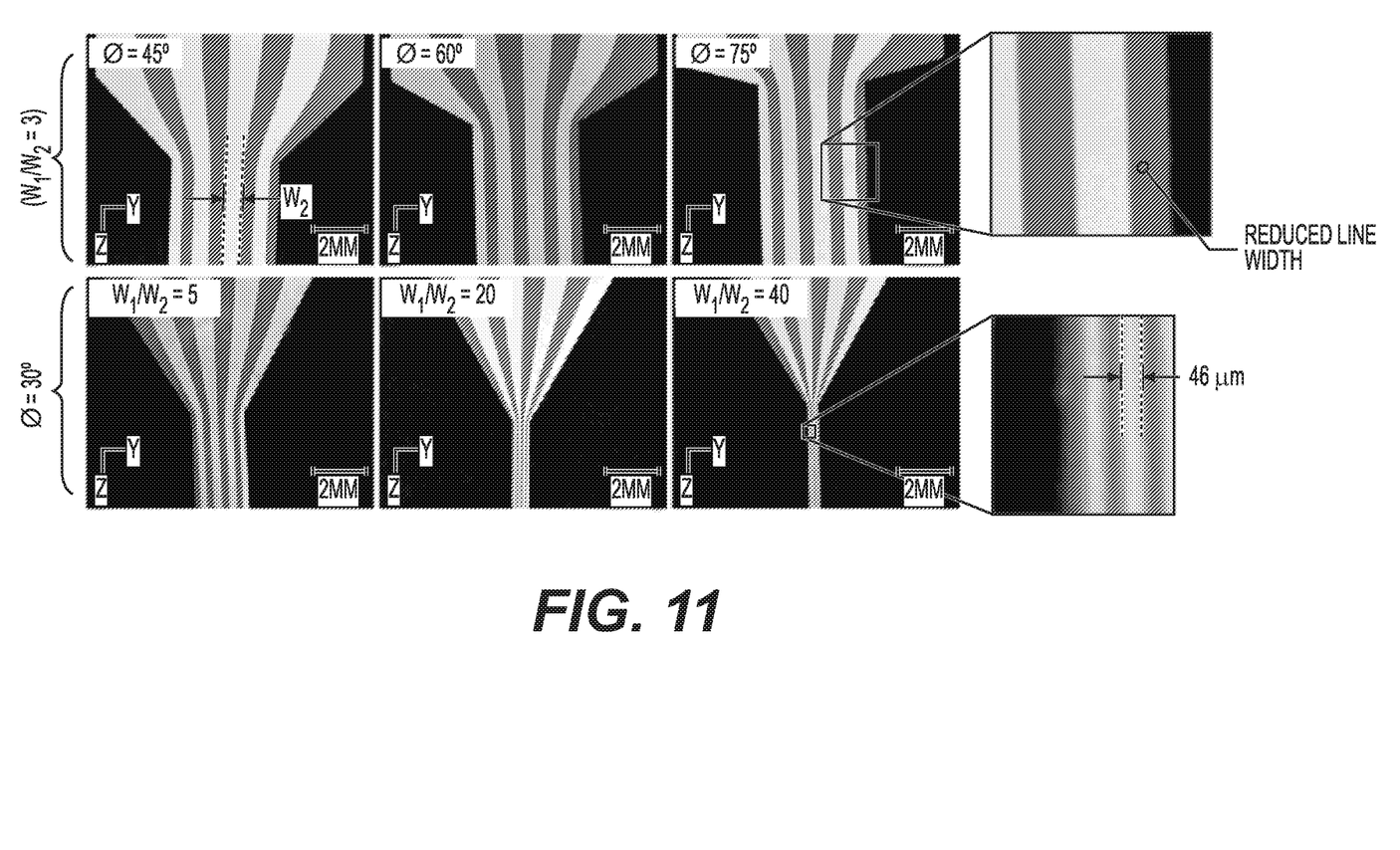
FIG. 11 illustrates a pattern with converging, alternating stripes in accordance with an exemplary embodiment of the disclosure.

FIG. 11 shows internal flow through a converging slot of alternating stripes of 10% PVA. Initial experiments with two 10% aqueous PVA solutions, one with less than 2% food dye added, and one dye-free, demonstrate viability for this patterning approach. Optical images of internal flow are organized in FIG. 11 for various permutations of $W_1/W_2$ and φ. The channel depth, equal to the slot gap G, is kept fixed at 76 μm. Volumetric flow-rate per stripe is 140 μL is in the top row of FIG. 11, and 40 μL is in the bottom row of FIG. 11. In addition to these flow-rates, values as low as 5 μL/s produce the same results without any resolvable variation.

Uniformity of stripe width is apparent in most cases, although some variation across the width of the slot is observed for ϕ=60°, 75°, with narrower stripes located at the channel periphery. This implies reduced flow-rate near the outer edge of the slot compared with the center, due to flow in the outer region experiencing the same pressure drop over a longer distance. At 46 gm, the smallest feature size achieved, the aspect ratio of each individual stripe is approximately unity ($w_1/G \approx 1$).

While this invention has been described in conjunction with specific embodiments described above, it is evident that many alternatives, modifications and variations will be apparent to those skilled in the art. Accordingly, the preferred embodiments of the invention, as set forth above, are intended to be illustrative not limiting. Various changes may be made without departing from the spirit and scope of the invention.

We claim:

1. An apparatus for patterning thin films comprising:
    a slot die comprising a first plate, a second plate, and a shim separating the plates;
    at least two fluid inlets, a first fluid inlet:
        positioned at a first fluid inlet height position between a top and bottom of the slot die, the distance between the top and bottom of the slot die defining a height of the slot die;
        positioned at a first fluid inlet width position between a first side and a second side of the slot die, the distance between the sides of the slot die defining a width of the slot die; and
        configured for feeding a first fluid material into the slot die and to the shim; and
    a second fluid inlet:
        positioned at a second fluid inlet height position;
        positioned at a second fluid inlet width position different than the first fluid inlet width position; and
        configured for feeding a second fluid material into the slot die and to the shim; and
    at least three channels formed at least in part by the shim inside of the slot die:
        a first inlet channel fluidly communicative with the first fluid inlet and configured to receive the first fluid material;
        a second inlet channel fluidly communicative with the second fluid inlet and configured to receive the second fluid material; and
        a third interaction channel fluidly communicative with the first and second inlet channels;
    wherein each of the first and second inlet channels have a channel inlet coincident with the respective first and second fluid inlets in the slot die;
    wherein the third interaction channel is communicative at an upstream end to the first and second inlet channels and configured to receive a flow of the first fluid material and the second fluid material, and at a downstream end to a fluid multi-material outlet in the slot die through which a pattern of the first fluid material and the second fluid material can flow;
    wherein the third interaction channel defines a volume extending in a flow direction from the upstream end to the downstream end and configured such that the third interaction channel is free of a physical barrier separating the flow of the first fluid material and the second fluid material; and
    wherein the volume of the third interaction channel has a converging cross-sectional area from a width of the upstream end to a width of the downstream end, which is smaller than the width of the upstream end;
    wherein the apparatus is configured to receive a flow of the first fluid material simultaneous to a flow of the second fluid material and deposit a width-wise alternating stripe pattern of the first fluid material and the second fluid material on a surface of a substrate.

2. The apparatus of claim 1, wherein the first, second, and third channels are configured to enable fluidic communication through the slot die in a planar, continuous laminar flow; and
    wherein narrowing of the third channel width along a primary axis of flow causes interaction between the first fluid material and the second fluid material that is not disruptive to pattern formation.

3. The apparatus of claim 1, wherein the first, second, and third channels are configured to enable fluidic communication through the slot die in a planar, continuous flow.

4. The apparatus of claim 1, wherein the slot die comprises a material selected from the group consisting of stainless steel, aluminum, nylon, polycarbonate and combinations thereof.

5. An apparatus for patterning thin films comprising:
    a slot die comprising a first plate, a second plate, and a shim separating the plates;
    a first set of fluid inlets for feeding a first fluid material into the slot die;
    a second set of fluid inlets for feeding a second fluid material into the slot die at the same time as the feeding of the first fluid material;
    a first set of inlet channels defined at least in part by the shim laterally spaced apart along a width of the slot die and configured to receive the first fluid material, each of the inlet channels of the first set of inlet channels having a channel inlet coincident with a respective fluid inlet of the first set of fluid inlets in the slot die;
    a second set of inlet channels defined at least in part by the shim laterally spaced apart along the width of the slot die and configured to receive the second fluid material, each of the inlet channels of the second set of inlet channels having a channel inlet coincident with a respective fluid inlet of the second set of fluid inlets in the slot die; and
    a third interaction channel defined at least in part by the shim communicative at an upstream end to the first and second sets of inlet channels, and at a downstream end to a fluid multi-material outlet in the slot die through which a pattern of alternating first fluid material and second fluid material can flow;
    wherein the first set of inlet channels and the second set of inlet channels are arranged in an alternating order, such that an inlet channel of the first set of inlet channels is followed by an inlet channel of the second set of inlet channels as viewed laterally across the width of the slot die;
    wherein the third interaction channel is configured to receive at the upstream end alternating, simultaneous flows of the first fluid material and the second fluid material from the alternating layout of inlet channels;
    wherein the third interaction channel defines a volume extending in a flow direction from the upstream end to the downstream end and is further configured such that the third interaction channel is free of a physical barrier separating the flows of the first fluid material and the second fluid material; and
    wherein the volume of the third interaction channel has a converging cross-sectional area from a width of the upstream end to a width of the downstream end, which is smaller than the width of the upstream end.

6. The apparatus of claim 5, wherein the slot die is configured to generate a scaled alternating-stripe pattern from interaction between the first and second fluid materials within the third interaction channel.

7. The apparatus of claim 5, wherein the first set of fluid inlets lie in a row at a first height of the slot die across the width of the slot die;

wherein the second set of fluid inlets lie in a row at a second height of the slot die across the width of the slot die; and wherein the first height is different than the second height, such that the length of each of the inlet channels of the first set is different than the length of each of the inlet channels of the second set.

* * * * *